United States Patent [19]
Broad

[11] 4,380,302
[45] Apr. 19, 1983

[54] CONTAINER CLOSURE

[75] Inventor: David Broad, Crawley, England

[73] Assignee: Fisons Limited, England

[21] Appl. No.: 254,939

[22] Filed: Apr. 16, 1981

[30] Foreign Application Priority Data

Apr. 19, 1980 [GB] United Kingdom ................. 8012969

[51] Int. Cl.³ .............................................. B65D 53/00
[52] U.S. Cl. .................................... 220/235; 220/254;
220/288
[58] Field of Search ............... 220/235, 236, 254, 288;
215/360

[56] References Cited

U.S. PATENT DOCUMENTS

| | | | |
|---|---|---|---|
| 1,842,261 | 1/1932 | Garwood | 215/360 X |
| 2,292,726 | 8/1942 | Trippensee | 215/360 |
| 2,462,445 | 2/1949 | Weiss | 215/360 X |
| 4,084,330 | 4/1978 | Fraser | 220/235 |

Primary Examiner—George T. Hall
Attorney, Agent, or Firm—Merriam, Marshall & Bicknell

[57] ABSTRACT

The cap of a centrifuge sample tube has a larger than usual bore therethrough to facilitate sample loading and unloading. Sealing of the larger bored is better than seals which can be achieved with the very narrow bores hitherto considered essential to minimize potential sources of leakage of sample from the tube.

5 Claims, 3 Drawing Figures

CONTAINER CLOSURE

The present invention relates to a container closure, notably to a closure cap for a centrifuge sample tube.

It is often desirable to close the sample tubes used in a centrifuge to prevent escape of the contents of the tube during the centrifuging operation. This is conventionally done by a cap assembly which is fitted onto the open end of the tube and is then locked in position to resist hydraulic pressures which may be built up against the cap. For example, the tube wall is crimped or clamped between components of the cap which are drawn together by a screw mechanism; or by means of the radial expansion of a sealing member against the wall of the tube.

However, it is also often desired to remove separated components from the tube without disturbing the other contents of the tube as would usually happen when the closure cap is removed from the tube. The cap has therefore been provided with a small diameter bore through it to permit insertion of an hypodermic syringe needle into the tube to withdraw samples from the tube. This bore represents a potential leak in the cap and has been kept as small as possible, less than 4 mms in diameter, and has had to be sealed, usually by means of a grub screw sealing against a plastic insert in the bore.

The problems of leakage through the bore become particularly acute when the sample tube is centrifuged with its longitudinal axis substantially parallel to the axis of rotation of the rotor in which the tube is mounted, e.g. in a vertical tube rotor where hydraulic pressures exerted on the cap can be very high. Merely tightening down the grub screw against the plastic insert is not wholly effective and there has been a need to devise more effective sealing means. It has therefore been proposed to do away with the closure cap altogether, thus avoiding problems with the bore through the cap, and to heat seal the open end of a narrow necked sample tube—see for example the sample tube described in Specification No. 2021982.

Surprisingly, we have found that it is possible to achieve satisfactory sealing of the bore in a closure cap if at least the outer end of the bore is of larger diameter than has been used hitherto. Not only does the use of a larger diameter opening to the bore reduce the sealing problems, but it also offers a number of advantages with respect to filling, sample layering and sample removing from the tube.

Accordingly, the present invention comprises a closure cap adapted to be mounted in sealing engagement upon the end of a tubular container which cap is provided with an aperture therethrough characterised in that the aperture has a diameter over at least part of its length of at least 5 mms. The invention also provides such a cap having means for closing the aperture and a centrifuge rotor having a plurality of recesses adapted to receive sample containers, notably with the longitudinal axes of the recesses substantially parallel to the intended axis of rotation of the rotor, in association with containers closed with the closure caps of the invention.

The closure cap for present use can be of any suitable form, e.g. can be a cap for a sample tube which clamps or crimps the tube as described above.

Figure 1:
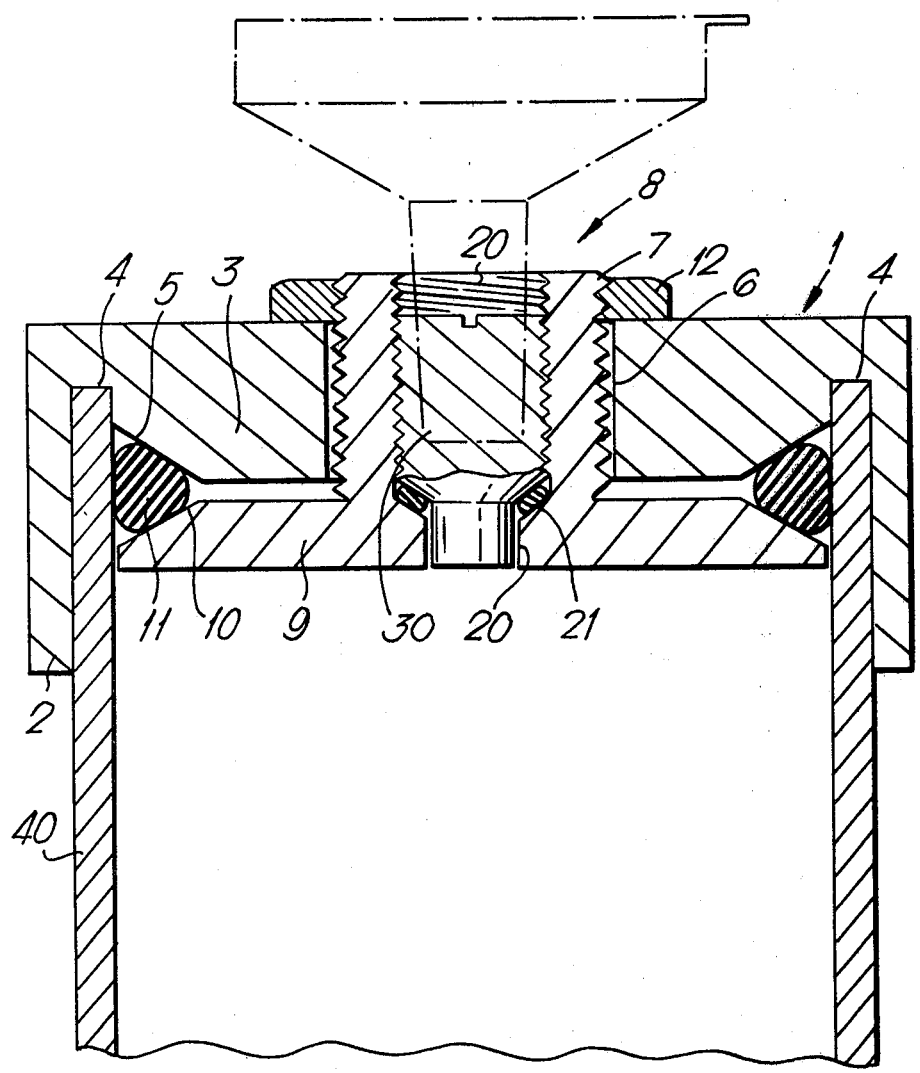
FIG. 1 is vertical sectional view illustrating a closure cap for a tubular container such as a centrifuge tube constructed in accordance with the principles of the present invention.

For convenience the present invention will be described with respect to that form of closure cap wherein an O ring is expanded radially to clamp the closure cap onto the sample tube. Such a closure cap is shown diagrammatically in the vertical sectional view of FIG. 1 and in greater detail in FIG. 2 of the accompanying drawings.

The cap comprises an outer member 1 having an annular skirt 2 and a dependant central portion 3 which defines with skirt 2 an annular recess 4 which is adapted to receive the open end of a sample tube. Portion 3 has a peripheral chamfered face 5. Member 1 has a central longitudinal bore 6 therethrough which is adapted to receive the longitudinal stem 7 of a clamping piece 8 which comprises a generally circular transverse member 9 having a peripheral chamfered face 10 which co-operates with face 5 to form a V shaped recess in which is located a sealing O ring 11. Stem 7 is externally screw threaded and carries a tightening nut 12, which bears against the outer face of member 1 to move the member 9 axially relative to centre portion 3. This draws the clamping piece 8 against member 1, thus reducing the size of the V shaped recess and expanding the O ring 11 radially.

Figure 2:
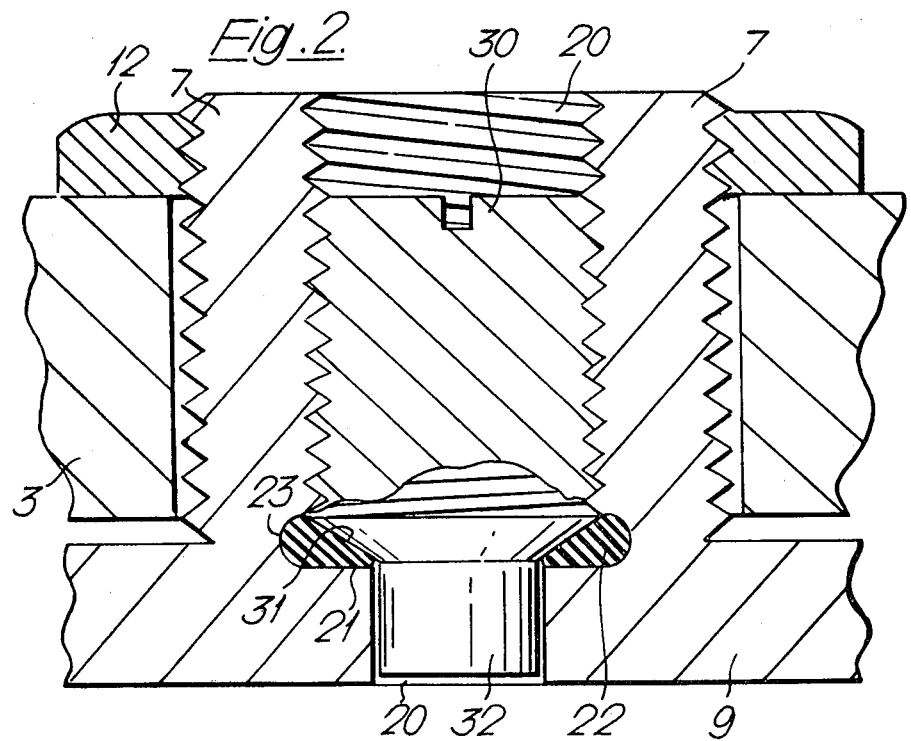
FIG. 2 is a vertical sectional view, partly fragmented, illustrating the closure cap of FIG. 1 in a sealed condition.

Stem 7 is also provided with a longitudinal bore 20 therethrough which is shown in greater detail in FIG. 2. For at least part of its length, bore 20 has a diameter of at least 5 mms, typically 6 to 12 mm. The bore 20 can extend full diameter for its whole length with a sealing insert or surface over at least part of its length against which the bore closure means described below seals. However, we prefer that the inner end of the bore 20 be of narrower diameter than the rest of bore 20, e.g. of 2 to 8 mms diameter, to provide an annular shoulder 21 against which the bore closure means butts. This shoulder is at least 0.5 mm, preferably 1-3 mm wide. The narrower section of bore 20 typically extends for from 5 to 25%, e.g. 5 to 15% of the total length of the bore. Where such a narrower section is present, the wider portion of bore 20 preferably extends for at least 5 mms, e.g. 5-20 mms, to enable the closure means to be securely mounted in the bore. Bore 20 is also provided with a sealing member. This can take the form of a cylindrical insert or lining which is compressed between the wall of the bore and the bore closure member or can take the form of an annular sealing disc, O ring or a sleeve which is trapped between the shoulder 21 and a bore closure plug. If desired, the sealing member can co-operate with one or more recesses within the bore into which it is driven by a closure plug, for example the annular recess 23 shown in FIG. 2.

Figure 3:
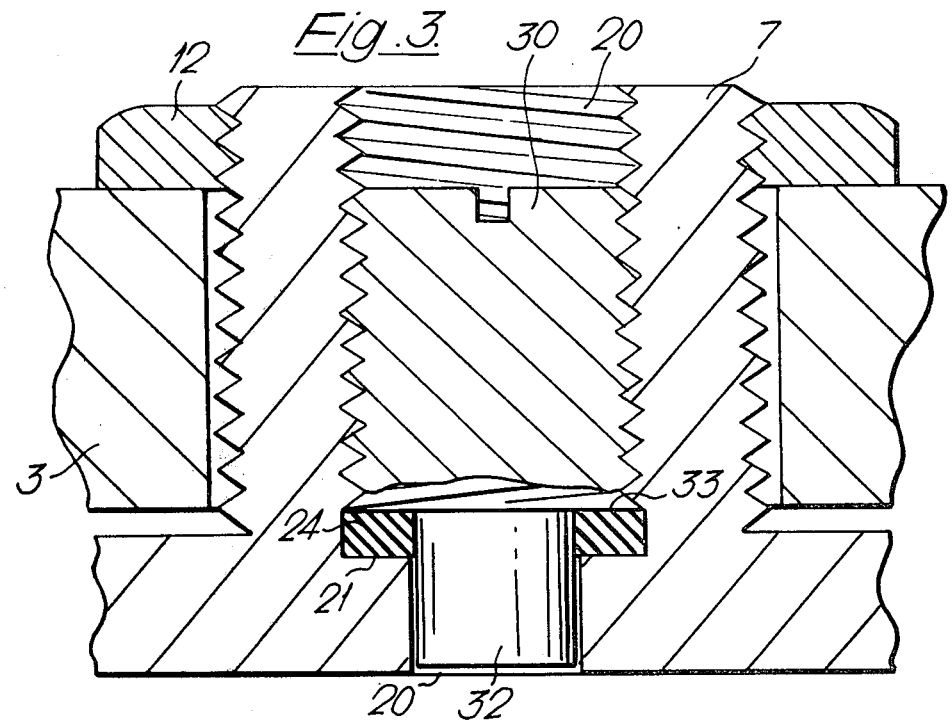
FIG. 3 is a vertical sectional view partly fragmented illustrating another embodiment of a closure cap in accordance with the present invention.

The sealing member forms a seal between the wall of bore 20 and a closure means 30. Preferably bore 20 is provided with an internal screw thread within its wider bore section and with a grub screw 30 which is screwed home in bore 20 to seat against the sealing member. As shown in FIG. 2 the inner end of the grub screw can be tapered to provide a conical face 31 which bears against the O ring 21 to expand it radially and thus form a sealed closure to bore 20. Alternatively as shown in FIG. 3, the grub screw 30 can have a face 33 which conforms substantially with the shoulder 21 in the bore so that the sealing sleeve 24 is trapped between the shoulder 21 and face 33 when the grub screw is screwed home. The grub screw 30 preferably terminates in a smaller diameter generally cylindrical tip 32 which protrudes as a clearance fit into the narrower diameter section of bore 20. This tip serves to inhibit creep of the sealing member through the narrow portion of the bore during centrifuging. Preferably the tip extends for at least 50%, e.g. 75 to 100% of the length of the narrower section when in position.

The closure cap of the invention can be used in a similar way to a conventional cap. Thus, the open end of a sample tube 40 is inserted into the annular skirt 2 and pushed home into recess 4. Nut 12 is then tightened to draw stem 7 axially through member 1 and thus draw the chamfered faces 5 and 10 together. This expands O ring 11 radially against sample tube 40 and clamps sample tube 40 against skirt 2, thus holding the cap onto the end of the sample tube. Sample can then be inserted via bore 20 which is then closed by inserting grub screw 30 and screwing it home against the sealing member 22 or 24.

By providing the larger diameter section to the bore 20 a larger sealing area can be achieved and thus improved sealing can be achieved, even though one is apparently aggravating the potential for leakage by increasing the size of the bore. Furthermore, where one uses conventional O ring sealing members it is possible to replace a sealing member readily, which may not be possible with plastic sleeves which deform under pressure to the shape of the screw thread within the bore and can not thereafter be readily removed. Also the wide diameter of the bore enables one to insert larger diameter sample feeding and removal tubes through the cap. It is also possible to provide a simple means for layering a sample on a gradient fluid within a sample tube carrying the closure cap of the invention. In this means gradient is introduced into the sample tube either directly or via the bore 20 with the closure cap on the sample tube. A funnel (shown dotted in FIG. 1) is inserted into bore 20 and is filled with the sample it is desired to layer on top of the sample within the sample tube. Gradient fluid is then withdrawn via a dip tube inserted through the funnel and reaching through bore 20 into the sample tube (preferably to the base thereof). As the gradient is withdrawn so the sample flows from the funnel via bore 20 to lie on top of the gradient within the sample tube. When the sample has been drawn into the sample tube, the funnel and dip tube are removed and bore 20 closed, e.g. by grub screw 30. This method of introducing the sample is not practicable with narrow bores (i.e. less than 4 mm diameter) through the closure cap and reduces the risk of mixing the sample with the gradient which can occur when the sample is inserted by means of a hypodermic needle so as to fill a space above a gradient in the sample tube.

I claim:

1. A closure cap having an aperture therethrough and adapted to be mounted in sealing engagement upon the open end of a tubular container, said closure cap comprising an outer member having a dependant annular skirt; a dependant central portion which together with the skirt defines an annular recess adapted to receive the open end of the container, the central portion having a substantially central longitudinal bore therethrough; a transverse member mounted substantially co-axially within the outer member and having a longitudinal stem located within the bore in the central portion and axially movable relative to the central portion; the longitudinal stem having a longitudinal bore therethrough which is the aperture of the closure cap, and wherein the aperture has a narrower diameter portion thereof extending for from 5 to 25% of the length of the aperture.

2. A closure cap as claimed in claim 1 wherein the narrower diameter portion forms at its junction with the broader diameter portion of the aperture an annular shoulder from 1 to 3 mms wide.

3. A closure cap having an aperture therethrough and adapted to be mounted in sealing engagement upon the open end of a tubular container, said closure cap comprising a closure member adapted to be mounted within the aperture and a sealing member adapted to be engaged by the closure member within the aperture, and wherein the aperture includes a narrower diameter portion and the closure member is provided with a narrower diameter portion adapted to engage with the narrower portion of the aperture.

4. In a closure cap for use in the closure of centrifuge tubular containers, said closure cap having an aperture therethrough with a narrow diameter portion of less than about 5 mms, the improvement comprising:
   said aperture including a larger diameter portion extending upwardly from a junction with the narrow diameter portion;
   a sealing member adapted to be inserted within said aperture and located at said junction; and
   a closure member adapted to be insertably mounted within said aperture in sealing engagement with said sealing member at said junction for reliably sealing said aperture.

5. A tubular container suitable for use as a sample tube in a centrifuge in association with a closure cap as claimed in claim 4.

* * * * *